US010723169B2

(12) United States Patent
Kaiser

(10) Patent No.: US 10,723,169 B2
(45) Date of Patent: Jul. 28, 2020

(54) PLATFORM MOVEMENT SYSTEMS AND METHODS OF USING THE SAME

(71) Applicant: Elemental Device Design, LLC, Fort Wayne, IN (US)

(72) Inventor: Adam Kaiser, Fort Wayne, IN (US)

(73) Assignee: Elemental Device Design, LLC, Fort Wayne, IN (US)

( * ) Notice: Subject to any disclaimer, the term of this patent is extended or adjusted under 35 U.S.C. 154(b) by 0 days.

(21) Appl. No.: 15/677,367

(22) Filed: Aug. 15, 2017

(65) Prior Publication Data

US 2018/0043730 A1 Feb. 15, 2018

Related U.S. Application Data

(60) Provisional application No. 62/375,158, filed on Aug. 15, 2016.

(51) Int. Cl.
| | | |
|---|---|---|
| *B44C 1/22* | (2006.01) | |
| *F16H 21/16* | (2006.01) | |
| *B44B 3/06* | (2006.01) | |
| *B44C 1/20* | (2006.01) | |
| *B41J 3/407* | (2006.01) | |
| *B41J 11/06* | (2006.01) | |
| *B44B 1/06* | (2006.01) | |

(52) U.S. Cl.
CPC ............. *B44C 1/222* (2013.01); *B41J 3/4073* (2013.01); *B41J 11/06* (2013.01); *B44B 1/06* (2013.01); *B44B 3/063* (2013.01); *B44B 3/065* (2013.01); *B44C 1/20* (2013.01); *F16H 21/16* (2013.01)

(58) Field of Classification Search
None
See application file for complete search history.

(56) References Cited

U.S. PATENT DOCUMENTS

| | | | | |
|---|---|---|---|---|
| 5,172,276 A | * | 12/1992 | Ueyama .................. | G02B 7/10 359/697 |
| 9,156,204 B2 | * | 10/2015 | Knighton ............ | B29C 67/0055 |
| 2006/0133786 A1 | * | 6/2006 | Teramoto ............. | H04N 5/2253 396/55 |
| 2016/0091729 A1 | * | 3/2016 | Ollila ................. | H04N 5/23287 348/208.99 |

* cited by examiner

Primary Examiner — Alejandro Valencia
(74) Attorney, Agent, or Firm — Reichel Stohry Dean LLP; Mark C. Reichel; Natalie J. Dean

(57) ABSTRACT

Platform movement systems and methods of using the same. A system for moving a platform of the present disclosure can include a first actuator pivotally attached to a base, the first actuator having a first rod positioned therethrough and configured to move the first rod in a first direction and an opposing second direction along a first rod axis; a second actuator pivotally attached to the base, the second actuator having a second rod positioned therethrough and configured to move the second rod in a first direction and an opposing second direction along a second rod axis; an arm attached to the base using an arm connector; and a platform coupled to the first rod, the second rod, and the arm, the platform configured to move about the base upon operation of the first actuator and/or the second actuator.

20 Claims, 8 Drawing Sheets

PLATFORM MOVEMENT SYSTEMS AND METHODS OF USING THE SAME

PRIORITY

The present application is related to, and claims the priority benefit of, U.S. Provisional Patent Application Ser. No. 62/375,158, filed Aug. 15, 2016, the contents of which are hereby incorporated into the present disclosure in their entirety directly and by reference.

BACKGROUND

Current systems for use in connection with engraving, three-dimensional (3D) printing, etc., that incorporate platform movement are generally complex, require many parts, and are relatively expensive. In view of the same, systems, devices, and methods of using the same, to precisely control movement of a platform, as referenced in further detail herein, would be well received in the marketplace.

BRIEF SUMMARY

The present disclosure includes disclosure of systems for moving a platform, for example, in a controlled pattern upon a substrate so to facilitate printing, etching, etc., onto or upon an object positioned upon said platform.

The present disclosure includes disclosure of systems for moving a platform, as shown and described herein.

The present disclosure includes disclosure of a system for moving a platform, the system comprising a first actuator pivotally attached to a base, the first actuator having a first rod positioned therethrough and configured to move the first rod in a first direction and an opposing second direction along a first rod axis; a second actuator pivotally attached to the base, the second actuator having a second rod positioned therethrough and configured to move the second rod in a first direction and an opposing second direction along a second rod axis; an arm attached to the base using an arm connector; a platform coupled to the first rod, the second rod, and the arm, the platform configured to move about the base upon operation of the first actuator and/or the second actuator; and a controller, controlled using a processor in communication with the controller, configured to control operation of the first actuator and the second actuator.

The present disclosure includes disclosure of a system, further comprising an arm coupled to the base using an arm connector, the arm further coupled to the platform and configured to regulate movement of the platform.

The present disclosure includes disclosure of a system, wherein the processor is configured to control operation of the first actuator and the second actuator based upon software instructions accessible by the processor.

The present disclosure includes disclosure of a system, wherein the software instructions provide instructions to the processor to cause the first actuator and the second actuator to operate so to move the platform in a desired pattern.

The present disclosure includes disclosure of a system, wherein a tool positioned relative to the platform can place indicia upon and/or within an object positioned upon the platform.

The present disclosure includes disclosure of a system, wherein the tool is selected from the group consisting of a writing tool, a router, a laser, and a scribe, such as a nail or other relatively pointed element.

The present disclosure includes disclosure of a system, wherein the tool comprises a plastic deposition mechanism configured to deposit plastic onto the platform or onto the object positioned upon the platform.

The present disclosure includes disclosure of a method for controlling movement of a platform, as described herein.

The present disclosure includes disclosure of a system for moving a platform, comprising a first actuator pivotally attached to a base, the first actuator having a first rod positioned therethrough and configured to move the first rod in a first direction and an opposing second direction along a first rod axis; a second actuator pivotally attached to the base, the second actuator having a second rod positioned therethrough and configured to move the second rod in a first direction and an opposing second direction along a second rod axis; an arm attached to the base using an arm connector; and a platform coupled to the first rod, the second rod, and the arm, the platform configured to move about the base upon operation of the first actuator and/or the second actuator.

The present disclosure includes disclosure of a system for moving a platform, further comprising a controller, controlled using a processor in communication with the controller, the controller configured to control operation of the first actuator and the second actuator.

The present disclosure includes disclosure of a system for moving a platform, wherein the processor is configured to control operation of the first actuator and the second actuator based upon software instructions accessible by the processor.

The present disclosure includes disclosure of a system for moving a platform, wherein the software instructions provide instructions to the processor to cause the first actuator and the second actuator to operate so to move the platform in a desired pattern.

The present disclosure includes disclosure of a system for moving a platform, wherein the processor is configured to send signals to the controller.

The present disclosure includes disclosure of a system for moving a platform, wherein the arm is further coupled to the platform and configured to regulate the movement of the platform.

The present disclosure includes disclosure of a system for moving a platform, wherein the controller is configured to regulate power provided to the first actuator and the second actuator.

The present disclosure includes disclosure of a system for moving a platform, further comprising one more sliders positioned between the base and the platform.

The present disclosure includes disclosure of a system for moving a platform, further comprising a first rod connector configured to couple the first rod to the platform; and a second rod connector configured to couple the second rod to the platform.

The present disclosure includes disclosure of a system for moving a platform, wherein the first rod connector and the second rod connector engage the platform by way of a pin positioned therethrough.

The present disclosure includes disclosure of a system for moving a platform, wherein the platform comprises a lower platform element configured to move about the base, and an upper platform element coupled to the upper platform element.

The present disclosure includes disclosure of a system for moving a platform, further comprising a tool positioned relative to the platform, the tool configured to generate indicia upon and/or within an object positioned upon the platform due to movement of the platform relative to the tool.

The present disclosure includes disclosure of a system for moving a platform, wherein the tool is selected from the group consisting of a writing tool, a router, a laser, and a scribe.

The present disclosure includes disclosure of a system for moving a platform, wherein the tool comprises a plastic deposition mechanism configured to deposit plastic onto the platform or onto the object positioned upon the platform.

The present disclosure includes disclosure of a system for moving a platform, comprising a first actuator pivotally attached to a base, the first actuator having a first rod positioned therethrough and configured to move the first rod in a first direction and an opposing second direction along a first rod axis; a second actuator pivotally attached to the base, the second actuator having a second rod positioned therethrough and configured to move the second rod in a first direction and an opposing second direction along a second rod axis; an arm attached to the base using an arm connector; a platform coupled to the first rod, the second rod, and the arm, the platform configured to move about the base upon operation of the first actuator and/or the second actuator; a controller, controlled using a processor in communication with the controller, the controller configured to control operation of the first actuator and the second actuator; and a tool positioned relative to the platform, the tool configured to generate indicia upon and/or within an object positioned upon the platform due to movement of the platform relative to the tool.

The present disclosure includes disclosure of a system for moving a platform, wherein the tool is selected from the group consisting of a writing tool, a router, a laser, and a scribe.

The present disclosure includes disclosure of a system for moving a platform, wherein the tool comprises a plastic deposition mechanism configured to deposit plastic onto the platform or onto the object positioned upon the platform.

The present disclosure includes disclosure of a method for controlling movement of a platform, the method comprising operating a first actuator pivotally attached to a base, the first actuator having a first rod positioned therethrough and configured to move the first rod in a first direction and an opposing second direction along a first rod axis; operating a second actuator pivotally attached to the base, the second actuator having a second rod positioned therethrough and configured to move the second rod in a first direction and an opposing second direction along a second rod axis; operating a controller, controlled using a processor in communication with the controller, the controller configured to control operation of the first actuator and the second actuator; wherein operation of the controller controls operation of the first actuator and the second actuator to move a platform coupled to the first rod, the second rod, and an arm attached to the base so that the platform moves in a desired pattern.

The present disclosure includes disclosure of a method for controlling movement of a platform, wherein the step of operating toe controller is performed using software instructions that provide instructions to the processor to cause the first actuator and the second actuator to operate so to move the platform in the desired pattern.

The present disclosure includes disclosure of a method for controlling movement of a platform, further comprising the step of operating a tool positioned relative to the platform, the tool configured to generate indicia upon and/or within an object positioned upon the platform due to movement of the platform relative to the tool.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
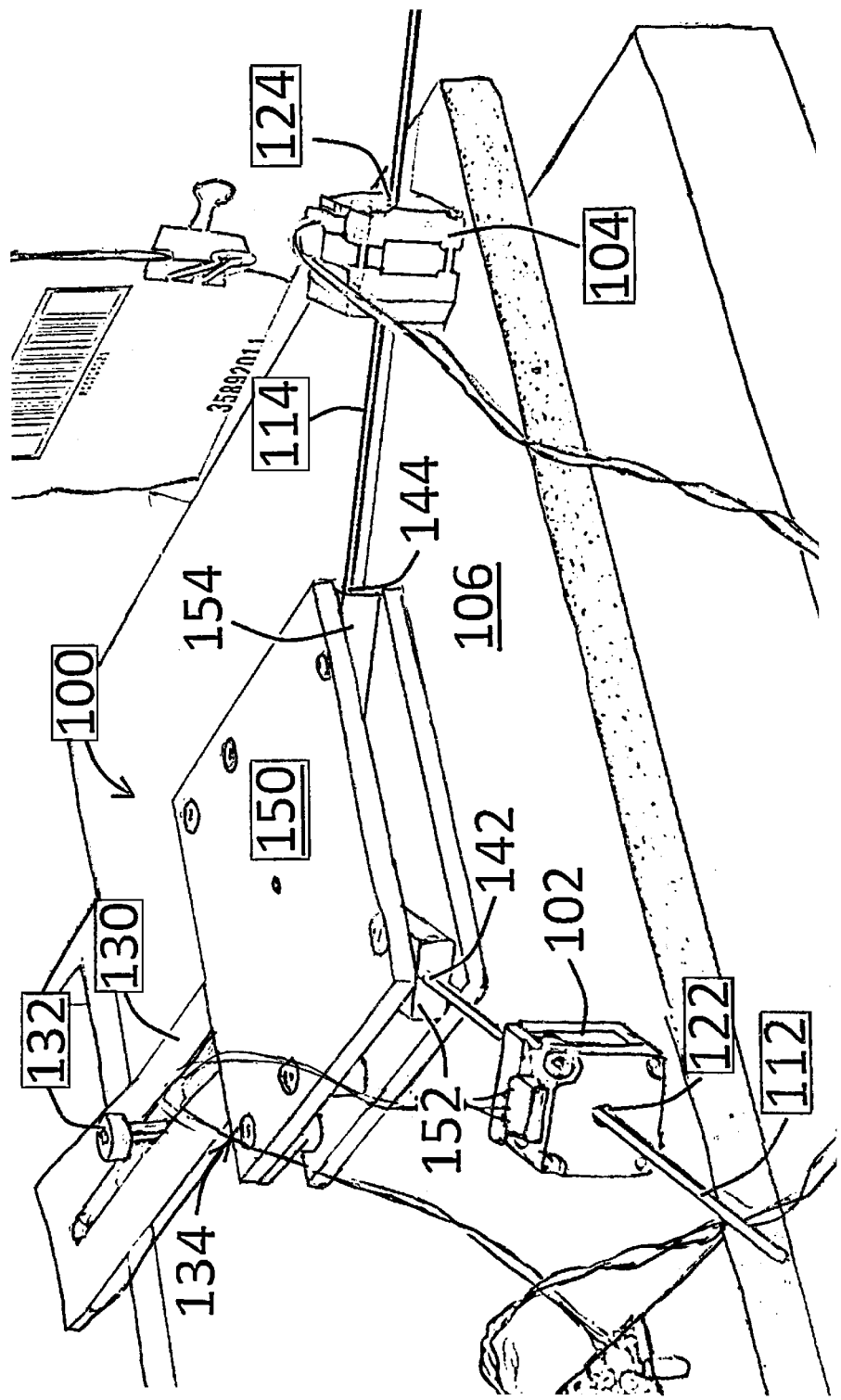
FIG. 1 shows a perspective view of components of a system, according to an exemplary embodiment of the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes disclosure of systems for moving a platform, for example, in a controlled pattern upon a substrate so to facilitate printing, etching, etc., onto or upon an object positioned upon said platform.

In an exemplary embodiment of a system 100 of the present disclosure, such as shown in FIG. 1, system 100 comprises a first actuator 102 and a second actuator 104, whereby each of first actuator 102 and second actuator 104 are pivotally coupled to a base 106, such as a melamine base or another exemplary base 106 made of a material such as stainless steel or another metal, steel, wood, plastic, etc.

A first rod 112 is positioned within an aperture 122 defined within first actuator 102, and a second rod 114 is positioned within an aperture 124 defined within second actuator 104. First rod 112 and second rod 114 are configured to move in and out of apertures 122, 124, such as along an axis defined by the lengths of rods 112, 114 themselves. Rods 112, 114 may be threaded, for example, so that movement of actuators 102, 104 cause rods 112, 114 to rotate and move relative to actuators 102, 104.

Figure 4:
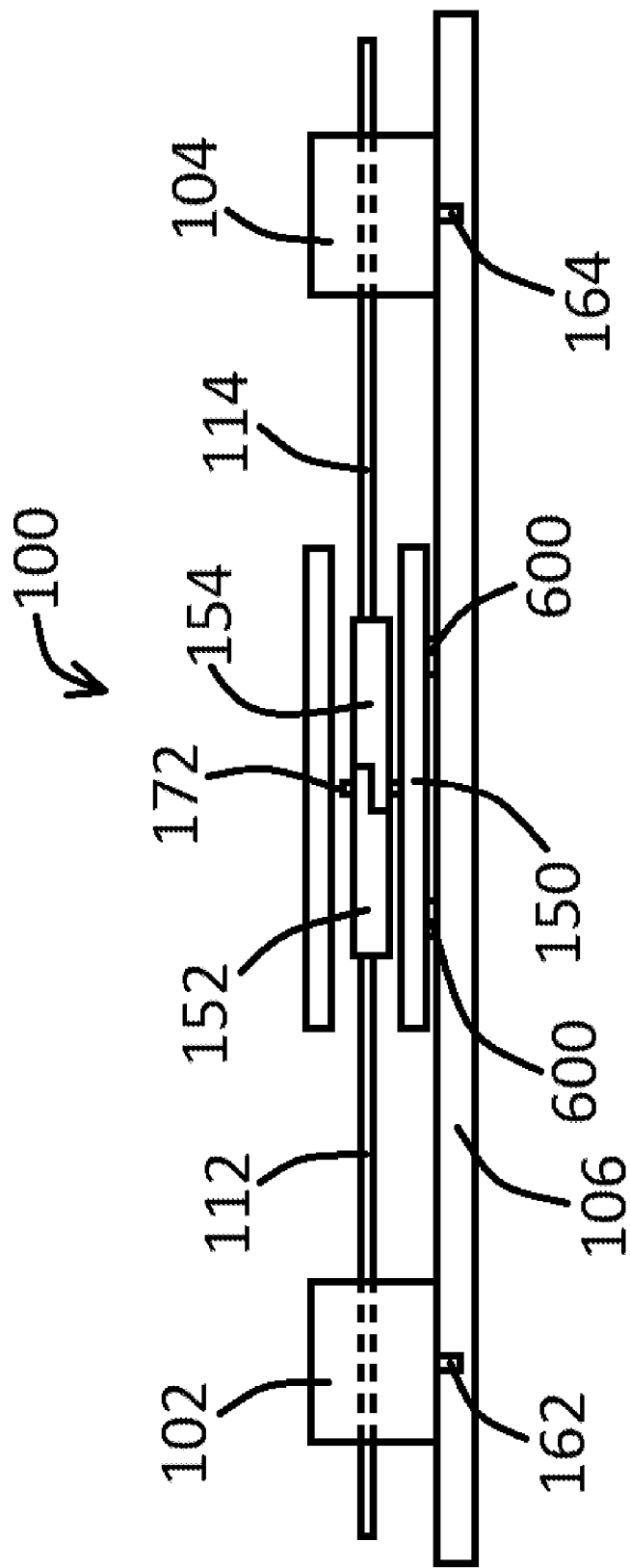
FIG. 4 shows a side view of components of a system, according to an exemplary embodiment of the present disclosure.

Systems 100 of the present disclosure further comprise a platform 150, whereby first rod 112 and second rod 114 engage platform 150 in a manner that allows platform 150 to move in various directions as ultimately dictated by first rod 112 and/or second rod 114, as described in further detail herein. Platform 150 moves on top of base 106, as shown in FIG. 1, so that an indicia 310, as referenced in further detail herein, can be positioned upon and/or within an object 350 positioned on top of platform 150. In view of the same, bases 106 that can readily permit platform 150 to move thereupon, such as a melamine, stone (such as granite), or plastic base 106 when using a metallic platform 150, such as aluminum for example, allows system 100 to readily operate as desired. Sliders 600, such as shown in FIG. 4 and referenced in further detail herein, can be positioned between base 106 and platform 150 to allow platform 150 to move easier (more smoothly) upon base 106, for example.

Figure 2A:
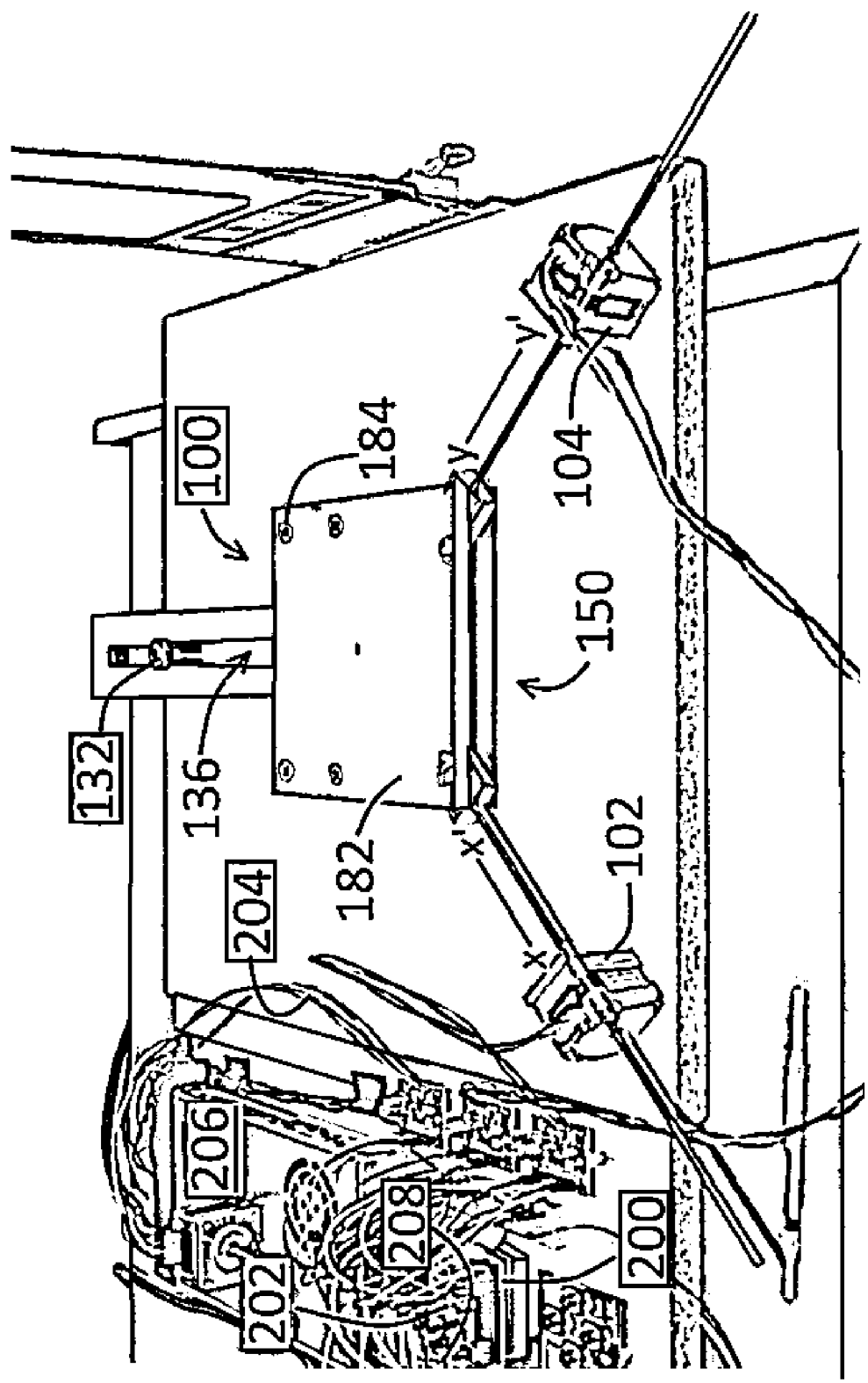
FIG. 2A shows a perspective view of components of a system, according to an exemplary embodiment of the present disclosure.

Platform 150 is further engaged by an arm 130 that engages base 106 using, for example, an arm connector 132. Arm 130, as referenced herein, is solidly attached to platform 150. A distal portion 134 of arm 130, a distal portion 142 of first rod 112, and a distal portion 144 of second rod 114 each engage platform 150, as shown in FIG. 1. Arm connector 132, first actuator 102, and second actuator 104, as shown in FIG. 2A, form a generally triangular shape. In various embodiments, a first rod connector 152 can be used to connect distal portion 142 of first rod 112 to platform 150, and a second rod connector 154 can be used to connect distal portion 144 of second rod 114 to platform, as shown in FIG. 1. Arm connector 132, as shown in FIG. 2A, is positioned within a linear slot defined within arm 130, so that as platform 150 moves due to operation of first actuator 102 and/or second actuator 104, platform 150 movement is managed due to movement of arm 130 relative to arm connector 132. Without said management of platform 150 movement, operation of first actuator 102 and/or second actuator 104 could cause platform 150 to spin and/or otherwise have unpredictable and/or uncontrollable movement.

Figure 2B:
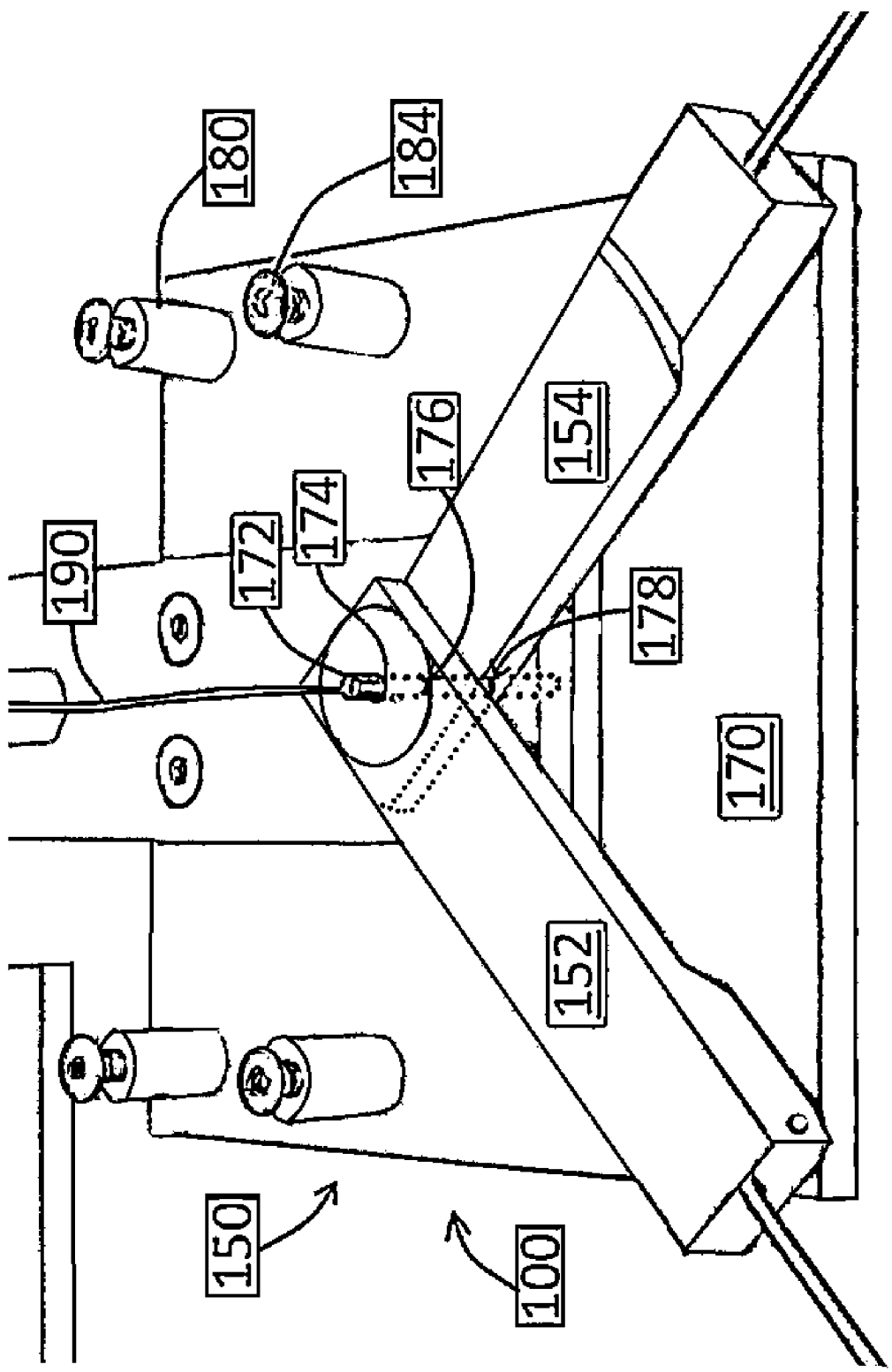
FIG. 2B shows a perspective view of a platform with components coupled thereto, according to an exemplary embodiment of the present disclosure.
Figure 6:
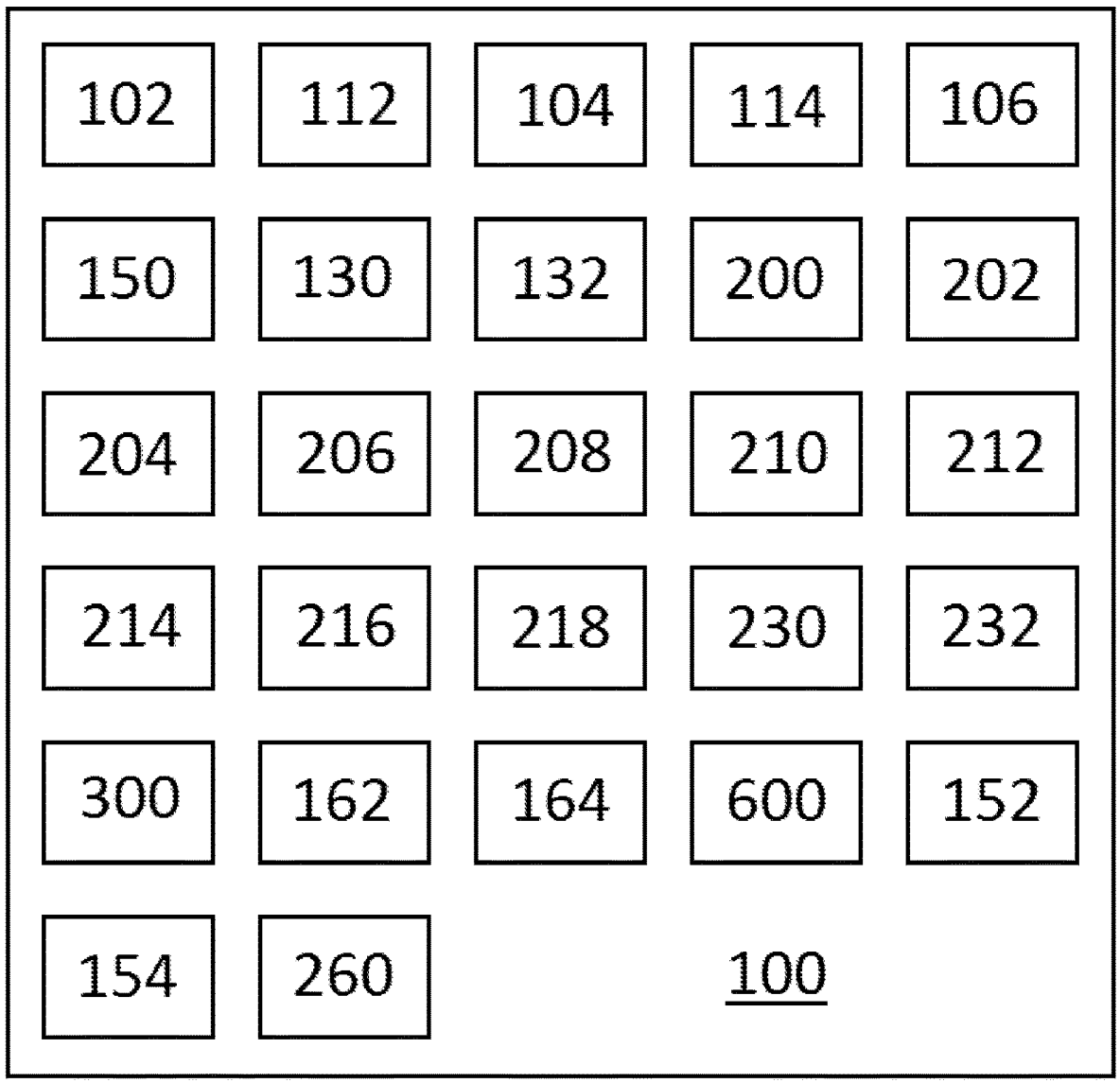
FIG. 6 shows a block component diagram of components of a system, according to an exemplary embodiment of the present disclosure.

FIG. 2B shows portions of an exemplary system 100 of the present disclosure, whereby an exemplary platform 150 is partially disassembled. As shown therein, a lower platform element 170 is positioned relative to and slides upon base 106, and first rod connector 152 and second rod connector 154 engage platform 150 by way of a pin positioned therethrough. Pin 172, as shown in FIG. 2B, is positioned through a first connector aperture 174 defined within first rod connector 152, a second connector aperture 176 defined within second rod connector 154, and further positioned within a pin aperture 178 defined within arm 130. A linear bearing 260 (shown in FIG. 6), for example, could be used in lieu of arm 130 and arm connector 132, whereby a relative end of the linear bearing could be attached to pin 172. Pin 172 provides a single point for platform 150 movement as controlled by operation of first actuator 102 and/or second actuator 104. In various embodiments, a tensioner 190, such as a spring, elastic band/cable, etc., can couple to pin 172 or other elements of platform 150, and further connect to other elements of system 100, such as arm connector 132, first actuator 102, second actuator 104, etc., so to eliminate potential flop (jerky movements) of platform 150 upon operation of first actuator 102 and/or second actuator 104. As referenced herein, first rod 112 and second rod 114 are essentially connected to a single point at a relative middle/center of platform 150, as pin 172 effectively connects said rods 112, 114 by way of connecting rod connectors 152, 154.

An exemplary platform 150 of the present disclosure, as shown in FIG. 2B, can comprise a lower platform element 170, as referenced above, platform spacers 180 extending from lower platform element 170, and an upper platform element 182, such as shown in FIG. 2A, whereby upper platform element 182 can connect to lower platform element 170 by way of fasteners 184 positioned through upper platform element 182 and into platform spacers 180.

Figure 3:
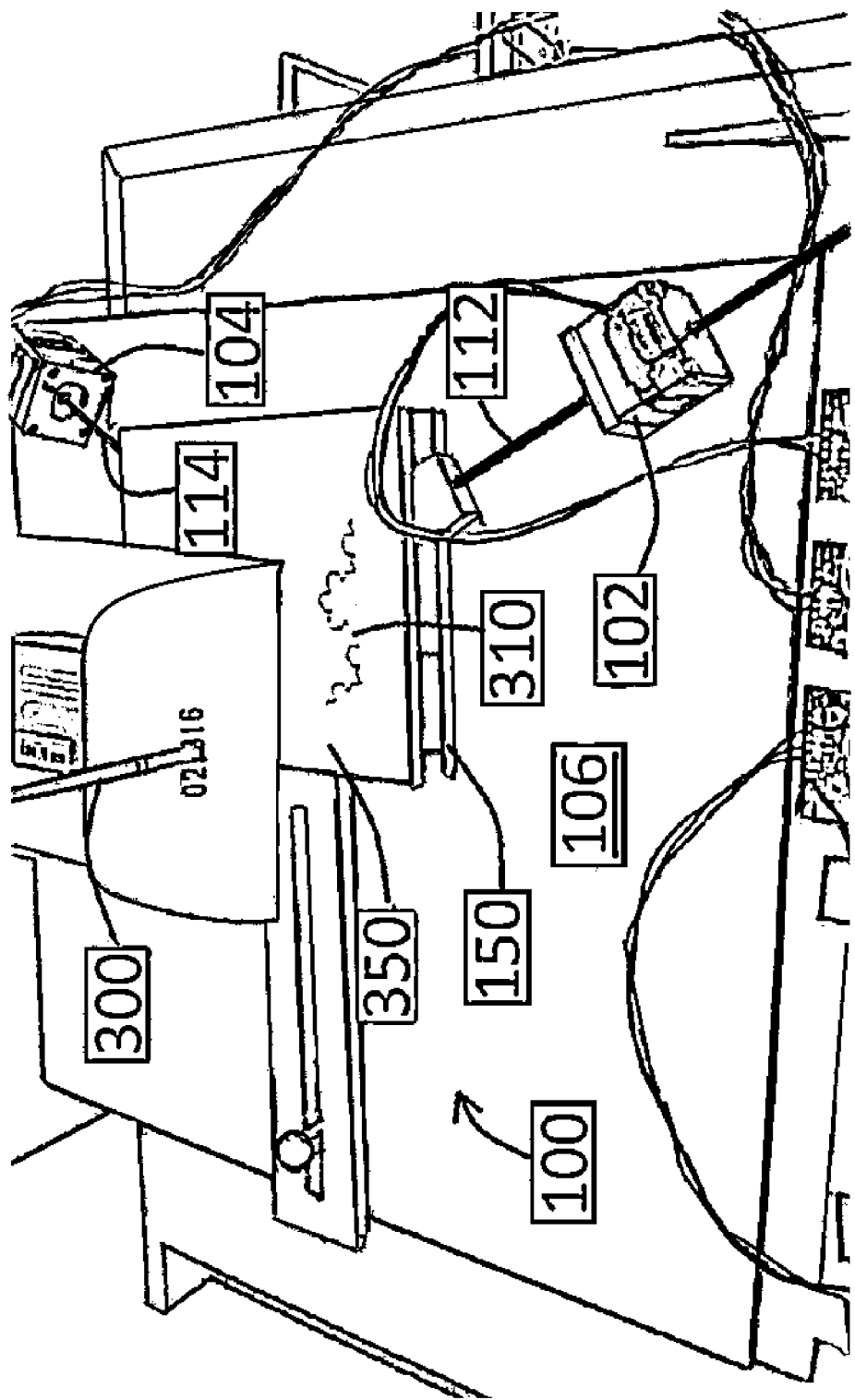
FIG. 3 shows a perspective view of components of a system using a tool, according to an exemplary embodiment of the present disclosure.

A controller 200, having a processor 202 (also referred to as a microprocessor 202), is operably coupled to each of first actuator 102 and second actuator 104, either serially or in parallel, and either wirelessly and/or using one or more wires 204. Instructions (such as within software) accessible and performed using processor 202 direct operation of first actuator 102 and second actuator 104, as may be desired, so that platform 150 moves along/about base 106 as desired. The software, stored on a storage medium 208 (a memory), for example, and accessible by processor 202, directs/instructs actuators 102, 104 to move in such a way that the coordinates on the platform 150 can be accessed so to ultimately generate the desired indicia 310, as shown in FIG. 3 and referenced in further detail herein. Processor 202, in at least one embodiment, comprises/is a single core advanced RISC machine (ARM) processor with floating point capabilities. A power supply 206, such as shown in FIG. 2A, can be used to provide power to other aspects of system 100, such as first actuator 102, second actuator 104, controller 200, and processor 202, for example. In at least one embodiment, controller 200 comprises a STM32F4 development board (STMicroelectronics).

Figure 2C:
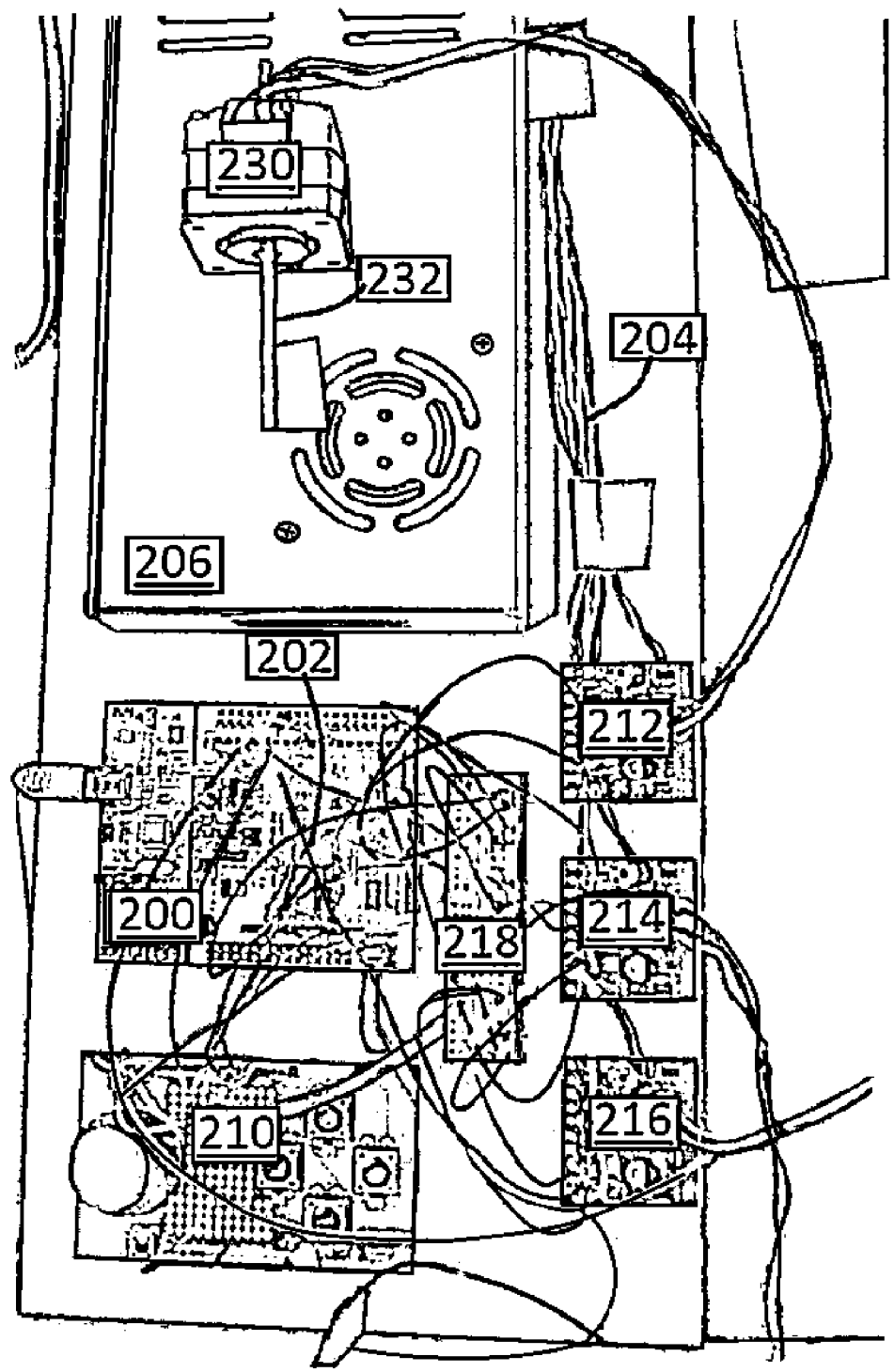
FIG. 2C shows components of a system, according to an exemplary embodiment of the present disclosure.

FIG. 2C shows another image of various components of exemplary systems 100 of the present disclosure. As shown therein, controller 200 comprises a processor 202, whereby processor 202 is a relatively low-voltage processor 202 (such as at or near 3V) configured to send general signals to other elements of system 100. Signals/instructions from processor 202 can travel through wires 204, as shown in FIG. 2A, to various motor controllers, such as motor controllers 212, 214, 216, shown in FIG. 2C, either directly or indirectly such as through/using a jumper block 218, for example, to facilitate the various wire 204 connections. Wires 204 can connect to various components of system 100, such as shown in FIG. 2C, and can be used to transmit signals or power therethrough, such as signals from processor 202 to jumper block 218 to other components, power from power supply 206 to motor controllers 212, 214, 216, and the like. Motor controllers 212, 214, 216 are relatively high-voltage elements (such as at or near 30V), as they are powered from power supply 206, which is configured to provide sufficient power to controllers 212, 214, 216. Motor controllers 212, 214, 216 are configured to instruct where and when to provide additional power, such as power to operate first actuator 102, second actuator 104, and/or other elements, such as a third actuator 230 (shown in FIG. 2C but not directly coupled to platform 150 in the embodiment shown, for example), which could be used as a third axis motor along with first actuator 102 and second actuator 104, if desired. Motor controllers 212, 214, 216 are configured as step and direction motor controllers so to control, for example, direction and speed of first rod 112, second rod 114, and a third rod 232, if desired. Exemplary systems 100 of the present disclosure may also comprise a button board 210, such as shown in FIG. 2C, in wired communication with controller 200, so to position platform 150, start and/or stop operation of system, etc., upon use of button board 210.

A tool 300, such as writing tool (pen, pencil, marker, crayon, etc.) for writing, a router for routing, a laser for laser cutting, a scribe (nail or other relatively pointed element) for scratching, a printer for three-dimensional (3D) printing, etc., can be positioned relative to platform 150 so that an object 350 positioned upon platform, such as paper, plastic, wood, metal, etc., can be engaged by tool 300 so to generate some sort of indicia 310 upon object 350, such as shown in FIG. 3. For example, object 350 can comprise paper and tool 300 can comprise a writing tool, so that operation of first actuator 102 and second actuator 104 causes platform 150 to move and causes the writing tool (tool 300) to write indicia 310 onto paper (object 350) as desired. Object 350 can comprise wood and tool 300 can comprise a router, so that operation of first actuator 102 and second actuator 104 causes platform 150 to move and causes the router (tool 300) to route indicia 310 onto wood (object 350) as desired. Object 350 can comprise metal, wood, or plastic and tool 300 can comprise a laser, so that operation of first actuator 102 and second actuator 104 causes platform 150 to move and causes the laser (tool 300) to etch indicia 310 onto metal, wood, or plastic (object 350) as desired. Any number of tools 300 known or developed in the art can be used to generate indicia 310 into and/or upon any number of objects 350 known or developed in the art, using systems 100 of the present disclosure.

Processor 202, as referenced above, causes first actuator 102 and second actuator 104 to operate, as desired. First actuator 102 is operated by moving first rod 112 in a first direction or an opposite second direction relative to first actuator 102 within aperture 122 and along a first rod axis (defined by x-x' shown in FIG. 2A), and second actuator 104 is operated by moving second rod 114 in a first direction or an opposite second direction relative to second actuator 104 within aperture 124 and along a second rod axis (defined by y-y' shown in FIG. 2A). As first rod 112 and second rod 114 are also coupled to or otherwise engage platform 150, movement of at least one of first rod 112 and/or second rod 114 causes platform 150 to move. Furthermore, movement of first rod 112 and/or second rod 114 can also cause first actuator 102 and/or second actuator 104 to pivot relative to base 106, such that pivotal engagement of first actuator 102 and/or second actuator 104 relative base permits platform 150 to move as desired. Platform 150 can also move relative to an axis defined by arm 130, so that controlled operation of first actuator 102 and/or second actuator 104 using controller 200 can cause platform 150 to move, for example, in a desired pattern or patterns. Operation of only one of first actuator 102 or second actuator 104 would cause platform 150 to move in a relative arc (arcuate movement), and operation of first actuator 102 and second actuator 104 would be required in order to move platform 150 in a linear fashion, because platform 150 pivots around (due to) arm connector 132.

FIG. 4 shows a side view of various components of an exemplary system 100 of the present disclosure. As shown therein, first actuator 102 can be pivotally coupled to base 106 using a first pin 162, and second actuator 104 can be pivotally coupled to base 106 using a second pin 164, whereby pins 162, 164 are positioned at least partially within base 106 and are positioned within, coupled to, or formed as part of, actuators 102, 104. Sliders 600, such as comprising Teflon® material, plastic, felt, etc., can be positioned between base 106 and platform 150 to allow platform 150 to move easier (more smoothly) upon base 106, for example. Said sliders can be positioned at relative corners of platform 150, for example, to facilitate smooth movement of platform 150 relative to base.

Figure 5:
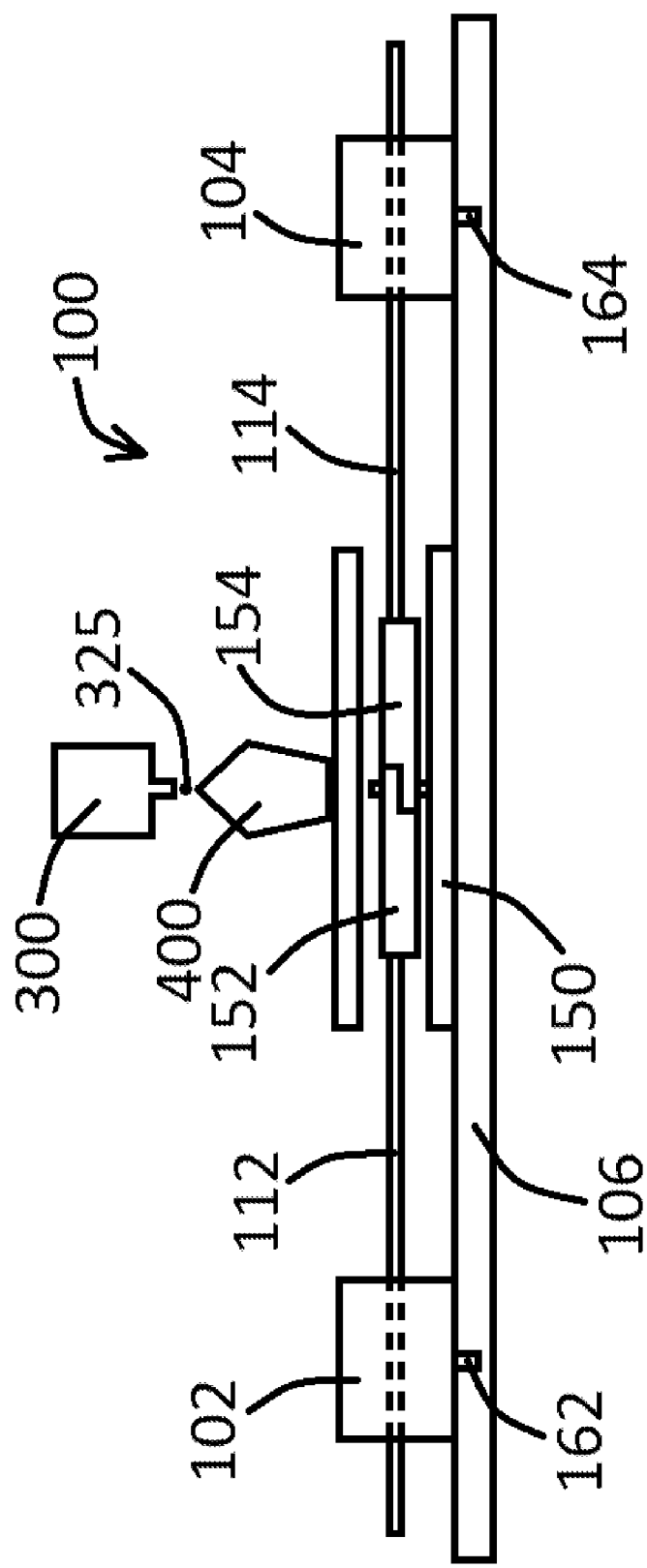
FIG. 5 shows a perspective view of components of a system used to three-dimensionally print a product, according to an exemplary embodiment of the present disclosure.

Tool 300, in various other embodiments, can comprise a plastic deposition mechanism for placing plastic upon platform 150 or an object 350, such as a flat object 350, positioned thereupon, so to three-dimensionally print (3D print) a product 400, such as shown in FIG. 5.

Should tool 300 can comprise a plastic deposition mechanism, operation of first actuator 102 and second actuator 104 can cause platform 150 to move and causes the plastic deposition mechanism (tool 300) to deposit plastic 325 onto platform 150 or object 350 as desired.

Various systems 100 of the present disclosure may be referred to, and/or be within a class or classes defined as, "parallel robot(s)" or "delta robot(s)." Systems 100 of the present disclosure have several benefits, including but not limited to having a minimum number of easily producible components, the ability to easily scale said systems 100 for various applications, and having very rigid and precise movement capabilities as compared to, for example, fully Cartesian machines. Said systems 100 can also move relatively heavy items, such as relatively heavy objects 350, positioned upon platforms. Systems 100 can also be ideal for routers (exemplary tools 300), such as printed circuit board (PCB) routers, so to etch patterns (indicia 310) upon printed circuit boards (exemplary objects 350).

Systems 100 of the present disclosure can comprise one or more of the following items:
a) a first actuator 102;
b) a first rod 112;
c) a second actuator 104;
d) a second rod 114;
e) a base 106;
f) a platform 150;
g) an arm 130;
h) an arm connector 132;
i) a controller 200;
j) a processor 202;
k) wires 204;
l) a power supply 206;
m) a storage medium 208;
n) a button board 210;
o) motor controllers 212, 214, and/or 216;
p) jumper block 218;
q) a third actuator 230;
r) a third rod 232;
s) a tool 300;
t) a first pin 162;
u) a second pin 164;
v) a slider 600;
w) a first rod connector 152; and/or
x) a second rod connector 154.

While various embodiments of platform movement systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible.

Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A system for moving a platform, comprising:
    a first actuator pivotally attached to a base, the first actuator having a first rod positioned therethrough and configured to move the first rod in a first rod first direction and an opposing first rod second direction along a first rod axis;
    a second actuator pivotally attached to the base, the second actuator having a second rod positioned therethrough and configured to move the second rod in a second rod first direction and an opposing second rod second direction along a second rod axis;
    an arm attached to the base using an arm connector, the arm having a linear slot defined therein; and
    a platform connected to the first rod and the second rod, the platform configured to move about the base upon operation of the first actuator or the second actuator; and
    a pin positioned through apertures defined within distal portions of the first rod and the second rod;
    wherein the system is configured so that operation of the first actuator and/or the second actuator causes the platform to move, with movement of the platform managed due to movement of the arm relative to the arm connector.

2. The system of claim 1, further comprising:
    a controller, controlled using a processor in communication with the controller, the controller configured to control operation of the first actuator and the second actuator.

3. The system of claim 2, wherein the processor is configured to control operation of the first actuator and the second actuator based upon software instructions accessible by the processor.

4. The system of claim 3, wherein the software instructions provide instructions to the processor to cause the first actuator and the second actuator to operate so to move the platform in a desired pattern.

5. The system of claim 2, wherein the processor is configured to send signals to the controller.

6. The system of claim 1, wherein the arm is configured to regulate the movement of the platform.

7. The system of claim 2, wherein the controller is configured to regulate power provided to the first actuator and the second actuator.

8. The system of claim 1, further comprising one more sliders positioned between the base and the platform.

9. The system of claim 1, further comprising:
    a first rod connector configured to couple the first rod to the platform; and
    a second rod connector configured to couple the second rod to the platform.

10. The system of claim 9, wherein the first rod connector and the second rod connector engage the platform by way of the pin positioned therethrough.

11. The system of claim 1, wherein the platform comprises a lower platform element configured to move about the base, and an upper platform element coupled to the upper platform element.

12. The system of claim 1, further comprising:
    a tool positioned relative to the platform, the tool configured to generate indicia upon and/or within an object positioned upon the platform due to movement of the platform relative to the tool.

13. The system of claim 12, wherein the tool is selected from the group consisting of a writing tool, a router, a laser, and a scribe.

14. The system of claim 12, wherein the tool comprises a plastic deposition mechanism configured to deposit plastic onto the platform or onto the object positioned upon the platform.

15. A system for moving a platform, comprising:
    a first actuator pivotally attached to a base, the first actuator having a first rod positioned therethrough and configured to move the first rod in a first rod first direction and an opposing first rod second direction along a first rod axis;
    a second actuator pivotally attached to the base, the second actuator having a second rod positioned therethrough and configured to move the second rod in a second rod first direction and an opposing second rod second direction along a second rod axis;
    an arm attached to the base using an arm connector;
    a platform connected to the first rod and the second rod, the platform configured to move about the base upon operation of the first actuator and/or the second actuator;
    the first rod and the second rod connected to the platform at the same point on the platform using a pin positioned through apertures defined within distal portions of the first rod and the second rod;
    a controller, controlled using a processor in communication with the controller, the controller configured to control operation of the first actuator and the second actuator; and
    a tool positioned relative to the platform, the tool configured to generate indicia upon and/or within an object positioned upon the platform due to movement of the platform relative to the tool;
    wherein the system is configured so that operation of the first actuator and/or the second actuator causes the platform to move, with movement of the platform managed due to movement of the arm relative to the arm connector.

16. The system of claim 15, wherein the tool is selected from the group consisting of a writing tool, a router, a laser, and a scribe.

17. The system of claim 15, wherein the tool comprises a plastic deposition mechanism configured to deposit plastic onto the platform or onto the object positioned upon the platform.

18. A method for controlling movement of a platform, the method comprising:
    operating a first actuator pivotally attached to a base, the first actuator having a first rod positioned completely therethrough and configured to move the first rod in a first rod first direction and an opposing first rod second direction along a first rod axis;
    operating a second actuator pivotally attached to the base, the second actuator having a second rod positioned completely therethrough and configured to move the second rod in a second rod first direction and an opposing second rod second direction along a second rod axis;

operating a controller, controlled using a processor in communication with the controller, the controller configured to control operation of the first actuator and the second actuator;

wherein operation of the controller controls operation of only the first actuator and the second actuator to move a platform connected to the first rod and the second rod, wherein distal portions of the first rod and the second rod has a pin positioned through apertures defined therein, wherein an arm having a linear slot therein is attached to the base using an arm connector so that the platform moves in a desired pattern in any lateral direction with movement of the platform managed due to movement of the arm relative to the arm connector.

19. The method of claim 18, wherein the step of operating toe controller is performed using software instructions that provide instructions to the processor to cause the first actuator and the second actuator to operate so to move the platform in the desired pattern.

20. The method of claim 18, further comprising the step of:

operating a tool positioned relative to the platform, the tool configured to generate indicia upon and/or within an object positioned upon the platform due to movement of the platform relative to the tool.

* * * * *